(12) United States Patent
Al-Mutairi

(10) Patent No.: US 8,276,309 B2
(45) Date of Patent: Oct. 2, 2012

(54) FISHING ROD WITH A CASTING MECHANISM

(76) Inventor: Mohammad Marzok Al-Mutairi, Fahaheel (KW)

( * ) Notice: Subject to any disclaimer, the term of this patent is extended or adjusted under 35 U.S.C. 154(b) by 266 days.

(21) Appl. No.: 12/836,708

(22) Filed: Jul. 15, 2010

(65) Prior Publication Data
US 2012/0011761 A1  Jan. 19, 2012

(51) Int. Cl.
*A01K 91/02* (2006.01)
(52) U.S. Cl. .......................................................... 43/19
(58) Field of Classification Search ............... 43/19–21, 43/15–16; 124/26–27
See application file for complete search history.

(56) References Cited

U.S. PATENT DOCUMENTS

| | | | | |
|---|---|---|---|---|
| 1,434,768 A | * | 11/1922 | Boggess | 43/19 |
| 2,089,744 A | * | 8/1937 | Golden | 43/19 |
| 2,873,547 A | | 2/1959 | Coelho | |
| 2,875,548 A | | 3/1959 | Stewart | |
| 3,001,316 A | | 9/1961 | Fefelov | |
| 3,656,252 A | | 4/1972 | Sherman | |
| 3,717,947 A | * | 2/1973 | Nomura | 43/19 |
| 5,491,924 A | | 2/1996 | Athanasiadis | |
| 5,735,074 A | | 4/1998 | Stauffer | |
| 6,880,286 B2 | | 4/2005 | Wyman | |
| 6,971,203 B1 | | 12/2005 | Foor | |
| 7,334,367 B2 | | 2/2008 | Moss | |

* cited by examiner

*Primary Examiner* — Kimberly Berona
*Assistant Examiner* — Danielle Clerkley
(74) *Attorney, Agent, or Firm* — Lowe Hauptman Ham & Berner, LLP

(57) ABSTRACT

A fishing rod with automatic casting mechanism includes an elongated fishing rod, a reel and a length of fishing line stored on the reel with one end of the line fixed to the reel and a plurality of line guides along the rod with a single line guide at the distal end thereof. The fishing line extends from the reel and through the line guides including the final line guide at the end of the rod. A weighted fishing lure is attached to an opposite end of the fishing line and includes the hook. In addition, a tubular member includes a front and rear position and spring biased mechanism including a coil spring contained within the tubular member for automatically casting the fishing lure over a body of water for a distance of 100 meters or more. A push button release for releasing the energy in the coil spring includes a gravity operated L-shaped element for blocking the movement of the button when the tip of the rod is disposed at an angle of less than 45° and allows the button to be pushed when the rod is disposed at about 45° angle or up to almost 90° to thereby automatically propel the lure and line across the water.

5 Claims, 6 Drawing Sheets

FISHING ROD WITH A CASTING MECHANISM

FIELD OF THE INVENTION

This invention relates to a fishing rod with an automatic casting mechanism and more particularly to a fishing rod with a casting mechanism for propelling a line and lure over a body of water for a distance of up to about 100 meters or more.

BACKGROUND FOR THE INVENTION

Spring loaded fishing rods that allow a fisherman to cast without using a swinging force of an arm are well known and have been in use for many years. For example, a casting device is disclosed in U.S. Pat. No. 2,873,547 of G. Coelho. As disclosed therein a projecting mechanism that is capable of having a sinker inserted therein is characterized by a spring projected firing pin that functions like a gun for projecting a line and lure a distance based on the distance of the spring.

A more recent approach to a fishing rod and casting mechanism is disclosed in a U.S. Pat. No. 3,656,252 of Sherman. As disclosed a fishing pole and casting mechanism is adapted to throw a lure, bait, float or sinker with the fishing line attached thereto and comprises a spring gun incorporated in the handle of the pole. The rod also includes a conventional casting reel. The disclosure is characterized by an extension of a conventional fishing rod which is in alignment with a casting reel and by the provision of selectively adjusting cocking means that tensions the spring gun for the desired distance of casting and which is predetermined according to the weight being cast.

An improvement in the aforementioned disclosures is set forth in a U.S. Pat. No. 5,491,924 of Athanasiadis wherein a manually held device having an elongated tube containing a compressed spring unit, into which tube a sinker of a connected fish line is adapted to be entered into abutment with the compressed spring. A stop restrains expansion of the compressed spring until a release by the fisherman is activated. Those conditions that compress springs forcefully expand to cast the abutting sinker and connected fish line an appreciable distance from the instrument into the water. A push-rod slidable in an elongated support mounted to the body of the instrument may be removed by the fisherman and entered into the engagement tube to return the spring unit to its compressed condition restrained by the stop.

Finally, a recent approach to a fishing rod with a casting mechanism is disclosed in a U.S. Pat. No. 7,334,367 of Moss et al. As disclosed a fishing rod includes an elongated shaft defining an interior space. A stop, a cocking rod, a firing rod and an energizing element are mounted in the interior space. The cocking rod may transfer energy to the energizing element. A trigger attached to the cocking rod is selectively moveable through an opening in the stop for releasing the energizing elements energy. A trigger release assembly proximates the trigger including a ball bushing slidably coupled to the cocking rod and a button extending through the elongated shaft. A rod tip is included for selectively retaining an item of fishing tackle attached to a fishing line. Means are included for anchoring and locking the position of the fishing line. In use, energy is transferred to the energizing element and then selectively released to automatically cast the fishing line by swinging the rod in a traditional casting motion by pushing a button.

Notwithstanding the above, it is presently believed that there is a need and a potential commercial market for an improved fishing rod and casting mechanism in accordance with the present invention. It is believed that there is a need and a commercial market for such devices since they include a safety device that protects a fisherman from inadvertently releasing a cast when the rod is in a horizontal and/or less that 45 degree angle. The device in accordance with the present invention is durable, simple to operate, and capable of being produced at a competitive price.

BRIEF SUMMARY OF THE INVENTION

In essence a fishing rod with an automatic casting mechanism for propelling a line and lure over a body of water includes an elongated rod, a reel and a length of fishing line stored on the reel with one end thereof fixed to the reel. The rod and casting mechanism also include a handle at a proximal end thereof and a plurality of line guides along the rod and a single line guide at a distal end thereof. The fishing line extends from the reel and through the line guides including the line guide at the distal end of the rod. A weighted fishing lure is attached to an end of the fishing line and includes at least one hook. The rod and mechanism also include a tubular member including a front and rear portion and a spring biased mechanism including a coil spring contained in the tubular member for automatically casting the fishing lure over a body of water for a distance of up to 100 meters or more and wherein the fishing line with lure extends out beyond the line guide at the distal end and is pulled back to the tubular member. A ring shaped handle extending out of the tubular member for compressing the coil spring. An important feature of the present invention resides in a gravity operated L-shaped element for blocking the movement of the button when a tip of the rod is disclosed at an angle of less than 45° and allows the button to be pushed when the rod is disposed at a 45° up to approximately 90° angle to thereby automatically propel the lure and line across the water for a distance of up to about 100 meters or more.

The invention will now be described in connection with the accompanying drawings wherein like reference numerals have been used to indicate like parts.

DESCRIPTION OF THE PREFERRED EMBODIMENTS OF THE INVENTION

Figure 1:
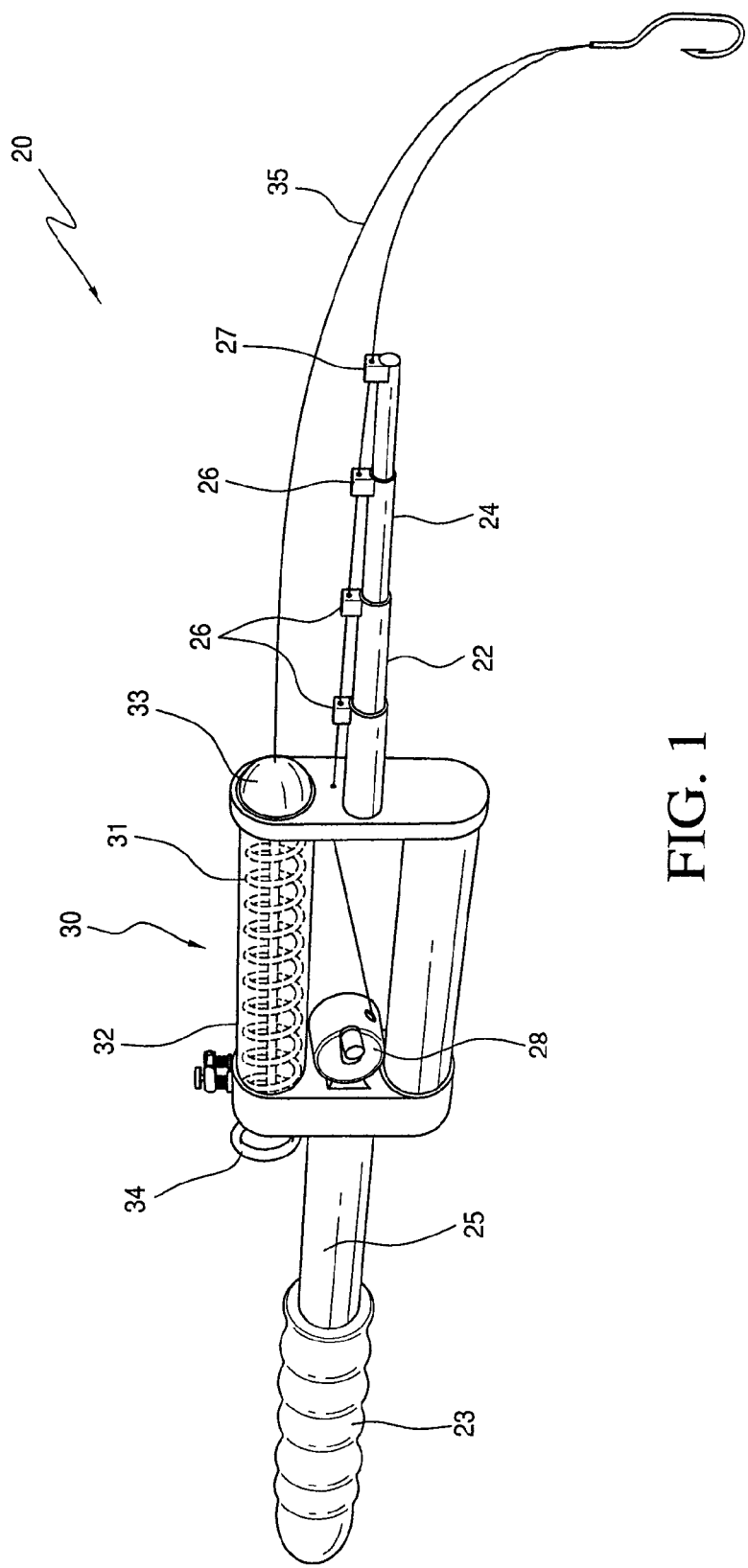
FIG. 1 is a perspective view of a fishing rod and automatic casting mechanism in accordance with the present invention.
Figure 2:
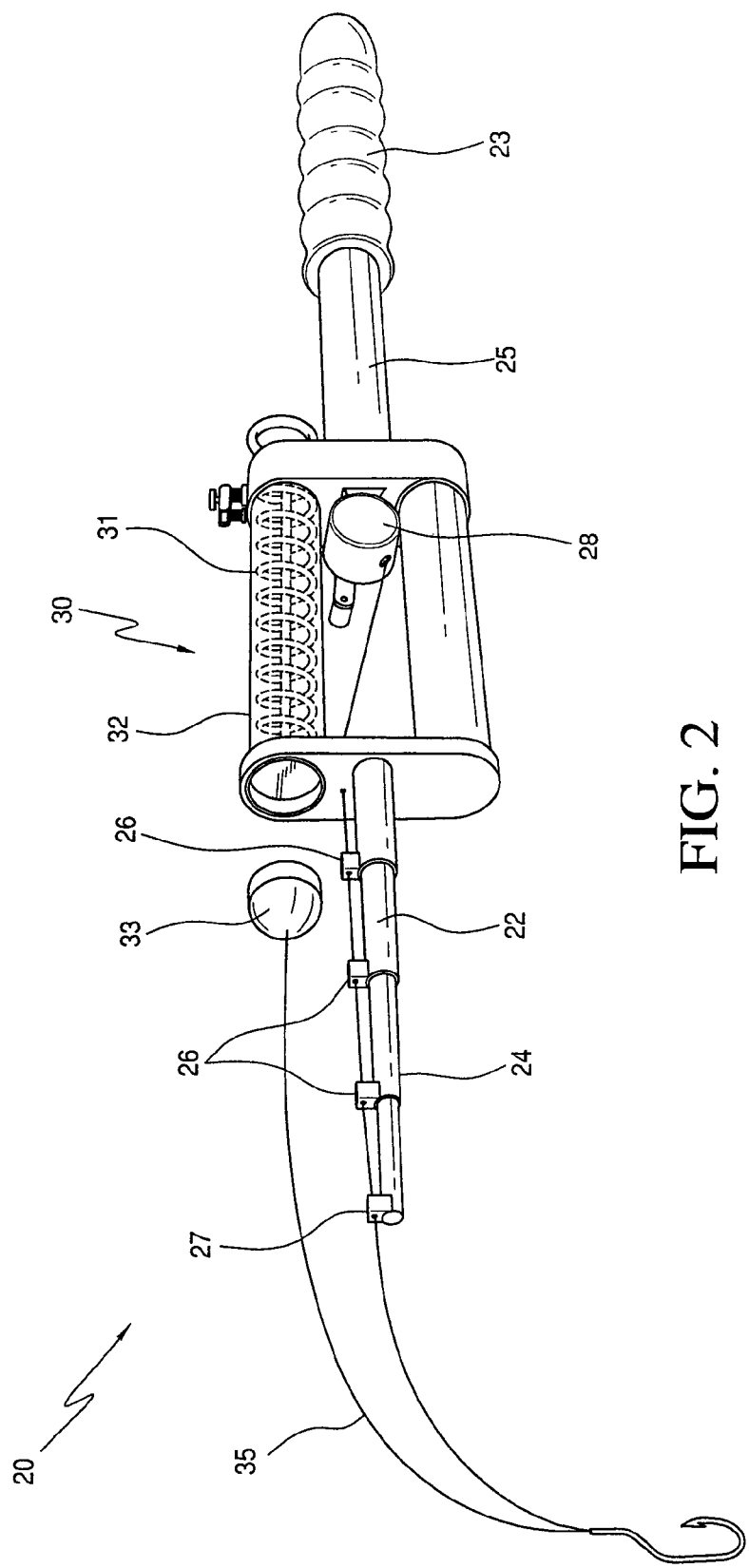
FIG. 2 is an exploded perspective view of the fishing rod and actuating mechanism shown in FIG. 1.
Figure 3A:
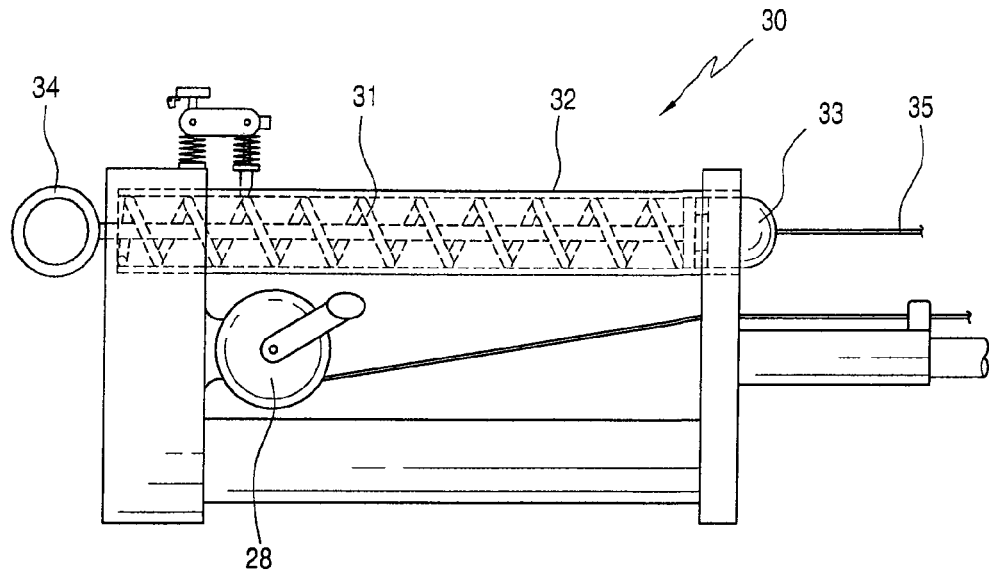
FIG. 3*a* is a side view of a fishing rod and casting mechanism with the coil spring fully extended.
Figure 3B:
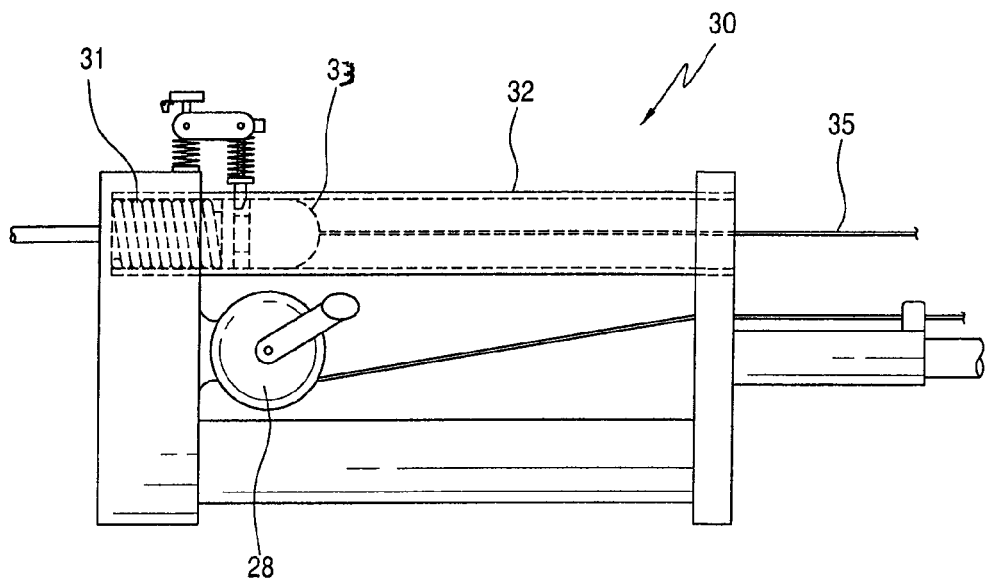
FIG. 3B is a side view of the fishing rod and casting mechanism shown in FIG. 3*a* prior to the release of the coil spring.
Figure 4:
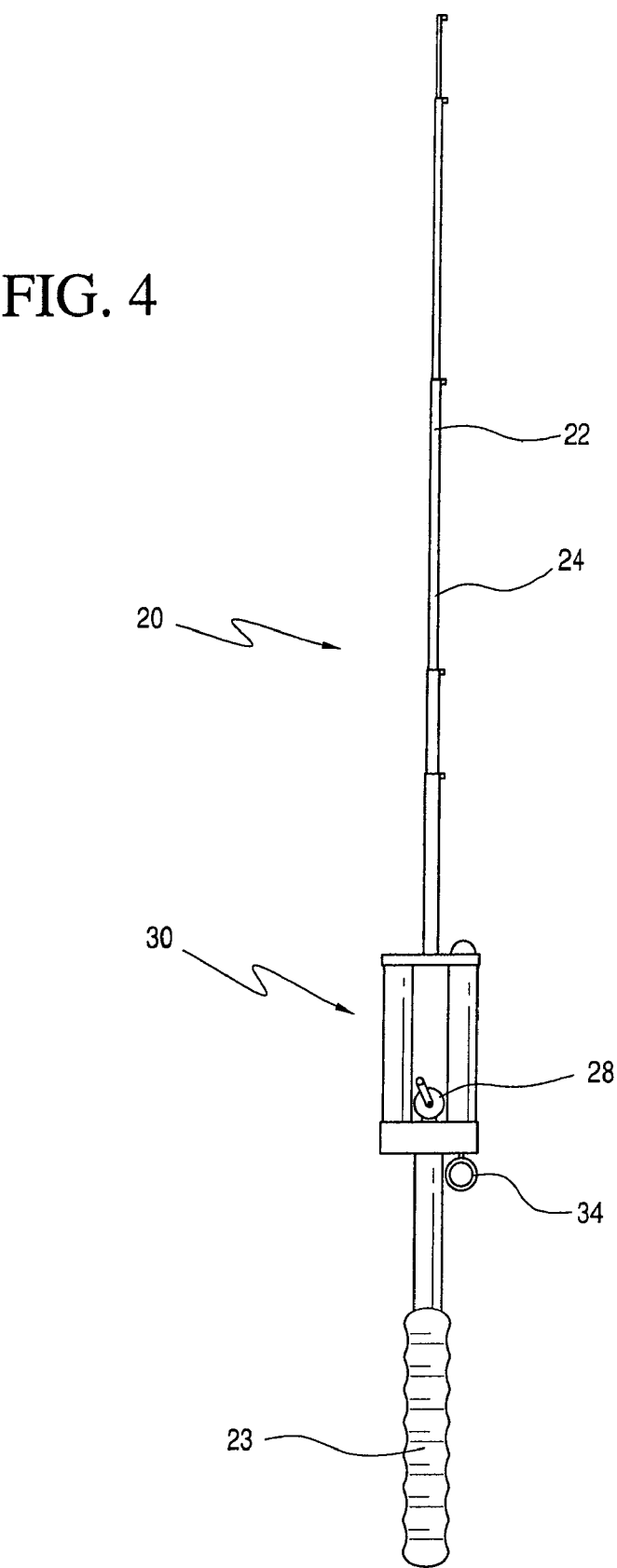
FIG. 4 is a side elevational view of a fishing rod shown in FIGS. 1-3.

The idea behind Applicant's modified fishing rod lays in attaching an automatic shooting mechanism that releases the hook and weighted lure. The mechanism is composed of a single cylinder located above a reel. At one end of the cylinder, the one nearer the user there is a ring shaped handle that can accommodate one or two fingers. The handle controls a spiral spring inside the cylinder. On the other end of the spring there is a round metal piece where the weight is attached. Once the user pulls the ring shaped handle towards him, the spring will subsequently pull the metal piece and the attached weight until it reaches the tip of the release button. The tip of the release button in turn secures the metal piece in place. Now the device is ready to shoot the hook and weight up to a long distance. The fishing rod also has a safety mechanism inside the release button. It will not go off when the rod is in a horizontal level or lower angle rather it will only be ready for discharge once tilted to 45 degrees or more toward the user. A control device sensitive to gravity frees the release button only when the fishing rod is disposed at approximately 45 degrees.

A fishing rod and casting rod 20 will not be described in connection with FIGS. 1-4 wherein the fishing rod and casting mechanism 20 includes a telescoping rod 22 and casting mechanism 30. The telescoping rod 22 also includes a conventional handle 23 and a telescoping rod portion 24 that is preferably made of fiberglass but can be made of metal or other suitable materials with a total length of about two meters. The rod portion 24 also includes a plurality of line guides 26 or eyelets and end line guide or eyelet 27 at the tip of the rod portion 24. A conventional reel 28 such as a spinning reel is disposed forwardly of the handle in a conventional manner, but may be disposed between a metal portion 25 of the handle 23 and the telescoping rod portion 24.

The casting mechanism 30 includes a first tubular member 32 with a coil spring 31 disposed therein. A weight 33 is disposed at the forward end of the coil spring 31 while a ring 34 is disposed at the rear of the tubular member 32. The ring 34 is grasped by one or two fingers to compress the spring 31 with the weight 34 pulled back into the tubular member 32. Thus when the compressed spring 31 is released the weight 33 is propelled out over a body of water with one end of a fishing line 35 attached thereto. In practice the weight 33 may be in the form of a fishing lure with a hook that remains on the outside of the tubular member 32.

Figure 5A:
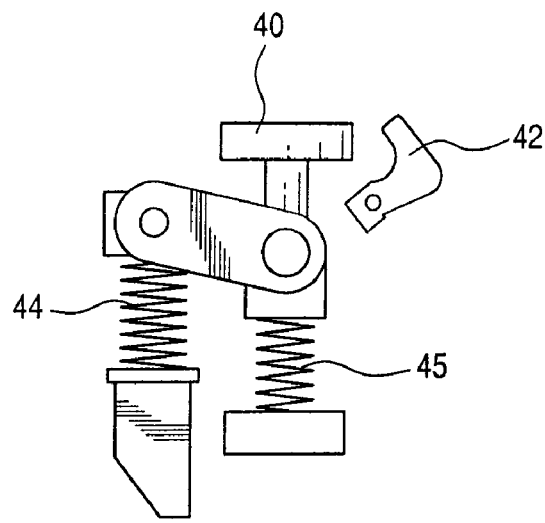
FIG. 5*a* is a side elevational view of a release button with a dual spring assembly with a L-shaped safety button in a release position.
Figure 5B:
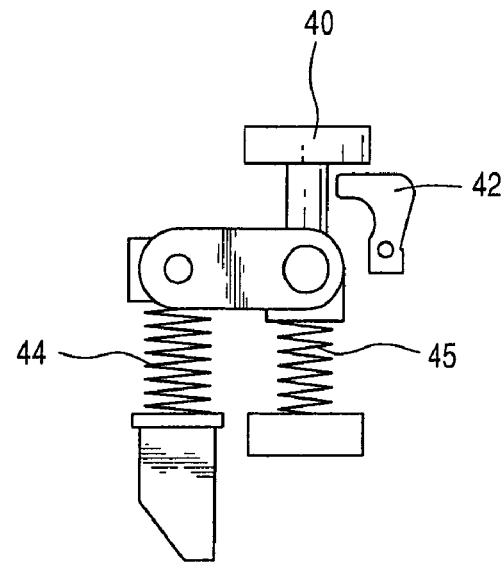
FIG. 5*b* is a side elevational view with a gravity activated L-shaped safety element that prevents the release button from being pushed.
Figure 6:
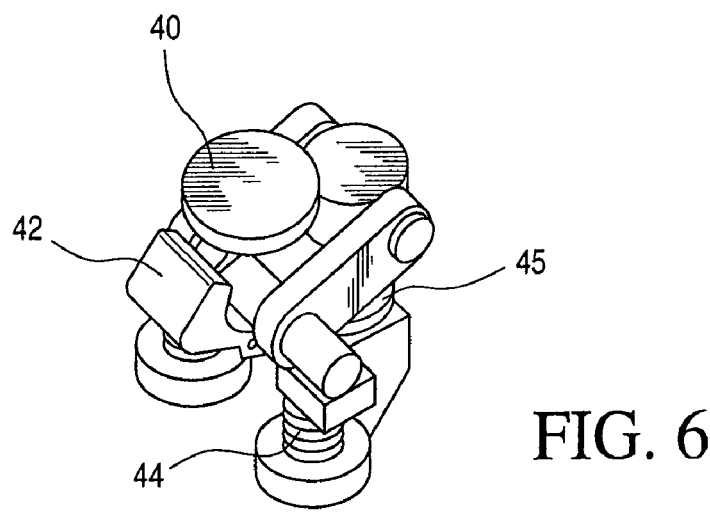
FIG. 6 is a perspective view of the dual spring push button release mechanism as used in the present invention.

Referring now to FIGS. 5a-8 a ring shaped handle 34 (FIG. 8) is pulled rearwardly using one or two fingers to compress the coil spring at the back of the tubular member 32 wherein it is latched in its compressed position. A release button includes a L-shaped member 42 that is biased into a locking position by gravity when the rod 22 is positioned in a horizontal position up to less than about 45 degree angle as shown in FIG. 5b. However, when the rod 22 is tilted upwardly at a 45 degree angle the gravity activated L-shaped member 42 frees the button 40 as shown in FIG. 5a so that it can be pushed to thereby release the compressed spring 31 to propel the weight 33, lure and hook out over the body of water.

The release button mechanism contains two inter/connecting springs 44 and 45 that act opposite each other. In other words, pressing one of the springs down lifts the other spring. Once pressed the compressed spring is released and projects the weight, lure and line out over the water.

The fishing line 35 is tied to the bullet shaped weight 33 and is pulled off of the reel 28 as it is propelled for a distance of up to about 100 meters or more. The inner end has a second round edge that allows it to be attached to the metal piece. In all cases the fish hook remains outside the cylinder 32.

Figure 7:
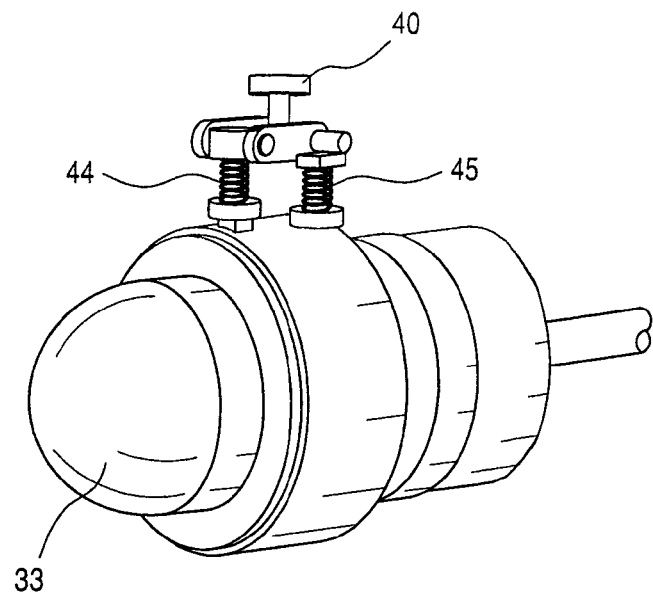
FIG. 7 is a schematic illustration of a casting mechanism with the coil spring compressed and the button activated latch.
Figure 8:
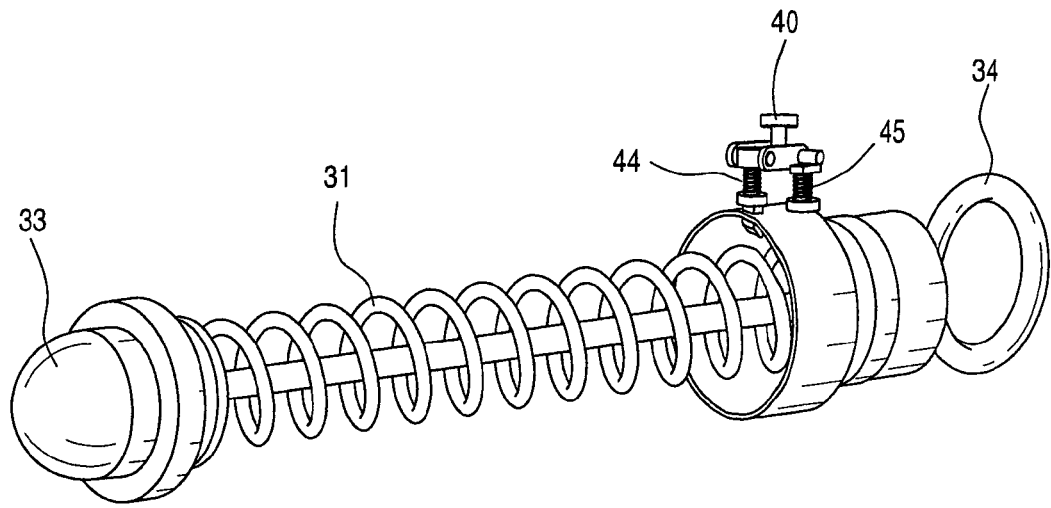
FIG. 8 is a perspective view of the coil spring mechanism after release of the compression in the coil spring.

As illustrated in FIG. 7, the metal piece is restricted to the rear position while FIG. 8 illustrates a fully extended coil spring 31 before compression of the spring or after release but before the metal piece is separated therefrom.

While the invention has been described in accordance with its preferred embodiments it should be recognized that changes and modifications may be made therein without departing from the scope of the appended claims.

What is claimed is:

1. A fishing rod with an automatic casting mechanism for propelling a fishing line and lure over a body of water, said fishing rod and casting mechanism comprising:
   an elongated fishing rod, a reel and length of fishing line stored on said reel with one end thereof fixed to said reel and said rod including a handle at a proximal end thereof and a plurality of line guides along said rod and a single line guide at the distal end thereof and said fishing line extending from said reel and through said line guides including said line guide at said distal end;
   a weighted fishing lure attached to an opposite end of said fishing line and including a hook;
   a tubular member including a front and rear portion and a spring biased mechanism including a coil spring contained in said tubular member for automatically casting the fishing line over a body of water for a distance of 100 meters or more and wherein the fishing line with lure extends out beyond said line guides at said distal end and is pulled back to said tubular member; and
   a ring shaped handle extending out of said tubular member for compressing said coil spring;
   a catch mechanism for restraining said coil spring in a compressed position and a button for releasing said compressed coil spring; and
   a gravity operated L-shaped element for blocking the movement of said button when a tip of said rod is disposed at an angle of less than 45° and allowing said button to be pushed when said rod is disposed at a 45° angle or greater to thereby automatically propel said lure and line across the water.

2. A fishing rod with an automatic casting mechanism for propelling a fishing line and a lure over a body of water according to claim 1 in which the weighted lure and a metal piece are secured in place by said gravity operated L-shaped element and automatically released by pressing said button.

3. A fishing rod with an automatic casting mechanism for propelling a fishing line and a lure over a body of water according to claim 2 in which said release button includes two interconnected springs that act opposite to each other so that pressing one of the springs lifts the other of said springs.

4. A fishing rod with an automatic casting mechanism for propelling a fishing line and a lure over a body of water according to claim 3 in which said rod can be extended up to a distance of about 2 meters.

5. A fishing rod with an automatic casting mechanism for propelling a fishing line and a lure over a body of water, said fishing rod and mechanism consisting of:
   an elongated fiberglass fishing rod extendable to a length of about two meters, a reel and a length of fishing line having one end fixed to said reel and extendable to a distance of 100 or more meters and said rod includes a handle and a casting mechanism at a proximal end thereof and a plurality of line guides along said rod for retaining an end portion of the line in a substantially actual alignment with said rod;

a single line guide at a distal end of said rod and said fishing line extending from said reel to said single line guide, out of said single line guide and extending back to said casting mechanism;

a weighted fishing lure including a fishing hook attached to said fishing lure at a distal end thereof;

said casting mechanism comprises, a tubular member including a front and rear portion and a spring biased mechanism including a coil spring contained in said tubular member for automatically casting the fishing line and lure over a body of water, the fishing line with lure extending out beyond said single line guide at said distal end of said rod and is initially pulled back to said tubular member;

an extendable handle extending out of said tubular member for compressing said coil spring;

a latch mechanism for restraining said coil spring in a compressed position and a button for releasing said energy in said compressed coil spring to thereby propel said line and said weighted lure outwardly over a body of water;

a gravity operated L-shaped element for preventing movement of said button when a tip of said rod is disposed at an angle of less than 45° and horizontal and failing to block the movement of said button when the angle is 45° or greater; and wherein said button includes two interconnected coil springs that act opposite each other so that pushing one of the springs lifts the other spring.

* * * * *